Sept. 12, 1933.   H. J. GEORGEN   1,926,092
APPARATUS FOR FORMING FEED SCREWS AND CONVEYERS
Filed Oct. 6, 1930   2 Sheets-Sheet 1

Inventor.
Herman J. Georgen,
By Paul O. Pippel
Atty.

Sept. 12, 1933.   H. J. GEORGEN   1,926,092
APPARATUS FOR FORMING FEED SCREWS AND CONVEYERS
Filed Oct. 6, 1930   2 Sheets-Sheet 2

Inventor.
Herman J. Georgen,
By Paul O. Pippel
Atty.

Patented Sept. 12, 1933

1,926,092

UNITED STATES PATENT OFFICE 1,926,092

APPARATUS FOR FORMING FEED SCREWS AND CONVEYERS

Herman J. Georgen, Berwyn, Ill.

Application October 6, 1930. Serial No. 486,572

6 Claims. (Cl. 22—14)

My invention relates to an apparatus for casting feed screws and conveyers.

Heretofore, where such articles were of any considerable size or length, it was found impracticable to cast such articles in a single piece because of the fact they could not be formed straight, nor smooth enough to overcome excessive machining and finishing costs. To some extent the problem of forming large, heavy duty feed screws and conveyers has been met by casting short length sections and then welding or bolting adjoining sections together to form a continuous length as desired. Objections to so forming these articles exists because of the great cost and because of the absence of a clean smooth finish occasioned by projecting bolt or other securing parts. Welding is costly and forms objectionable seams where the sections are joined.

With this survey of the art in mind the primary object of this invention is to form, at a relatively low cost, one piece, cast feed screws or conveyers that will be devoid of projecting parts such as bolts, and which will be smooth and absolutely straight, whereby to eliminate straightening and finishing operations.

Another object is to provide an improved apparatus for forming sectional molds to be used for casting such articles in continuous, one piece form.

Other objects will become apparent to those skilled in this art as the disclosure is more fully made.

Briefly, these desirable objects may be achieved in the present disclosed embodiment of the invention by providing a molding box with which will be associated an improved screw pattern of a predetermined sectional length with its flights split at the pattern ends along pitch lines although the split may be along any part of a pitch line. Next is provided a centering plate for properly holding and locating the pattern in position in the molding box. With this accomplished, molding sand is thereupon rammed into the box to form the sand mold. Thereafter a guide plate is substituted for the centering plate and by means later to be described the pattern is removed in a manner which will cause no injury to the mold. This operation will be repeated until the required number of sand molds have been so made for a predetermined length of feed screw to be formed. These molds are then arranged appropriately on a support, end to end, with the molds closely abutting to form a continuous mold with the molded impressions therein all communicating or registering. The molten metal is then poured into the mold at one end and allowed to work through completely to fill the entire length of sectional mold. When the metal has hardened the sand mold will be broken away leaving the finished article ready for removal of the sprue and adhering sand.

In the accompanying sheets of drawings illustrating the preferred example of my invention:

Figure 1:
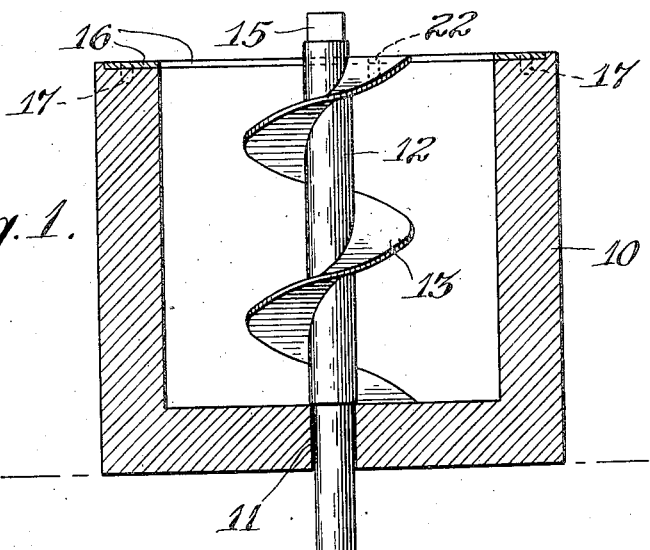
Figure 1 is a vertical sectional view through a molding box with the improved pattern section located therein.

The molding box appears at 10 the same being vertically disposed and having an open top and a bottom formed centrally with an aperture 11. The improved pattern formed as a feed screw or conveyer appears at 12 the same having flights 13 along a length equal to the useful depth of the molding box interior with the flights at the pattern ends severed flatly, or perpendicularly to the axis of the pattern shaft part, and in this disclosure preferably along their pitch lines although obviously the split may be along any desired part of the pitch lines. This pattern is integrally formed with a tail extension 14 coaxial with the lengthwise axis of the pattern, said tail to serve as a guide by being passed downwardly through the hole 11, as shown in Figure 1. This tail 14, if desired may be made longer than the flight section of the pattern arranged in the box, for a purpose later to appear. The top end of the pattern shaft protrudes upwardly the desired distance above the box top and is formed with a squared wrench engaging portion 15. Thus it will be seen that the entire pattern is formed as an integral member.

The top edges of the box walls each carry a plate 16, two oppositely disposed plates each formed with a pair of small, spaced holes 17. The manner of forming a sectional mold will now be described.

The box 10 rests on the ground or other appropriate support. Then the pattern 12 is placed vertically downwardly into the box, tail end first, with said tail 14 passing through the hole 11 in the box bottom until the bottom flight end (cut along its pitch line) rests flatly on the box floor. It will, of course, be understood that the box support, or ground, must be formed with a dug-out to receive the downwardly projecting tail 14. With this accomplished, a centering plate 18 having a center hole 19 is fitted over the upwardly projected end of the pattern shaft, said plate 18 further being provided at each end with a dowel pin 20 to fit one hole 17 on each top plate of the opposed side walls of the box, as shown clearly in Figure 5. This centering plate 18 is arranged straight across the center of the box as illustrated. Another dowel pin 21 carried by the plate 18 fits into a hole 22 in the severed top flight of the pattern. In this manner the pattern can be properly centered and held fast in the mold box. With the pattern in place the next operation is to ram the box, through its open top, full of molding sand. After thus completing the mold it becomes necessary to withdraw the pattern and in this connection it is obviously highly important that the pattern be removed, without in any way marring the impression formed in the sand mold. The mechanism used and the manner of withdrawing the pattern will now be described.

Figure 4:
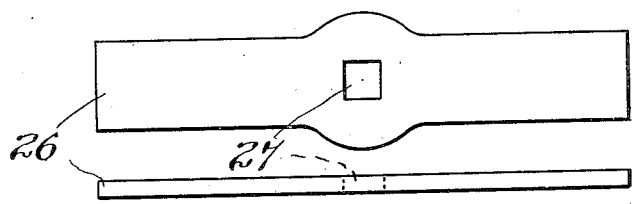
Figure 4 shows plan and side views of the wrench used when removing the pattern from a mold.
Figure 3:
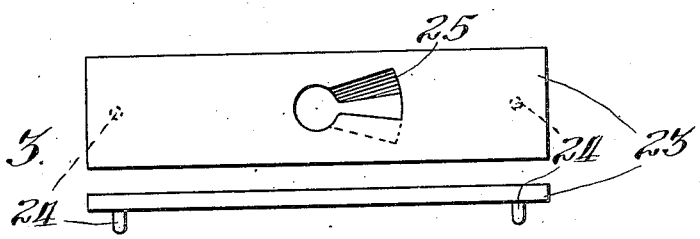
Figure 3 shows plan and side views of the guide plate.
Figure 2:
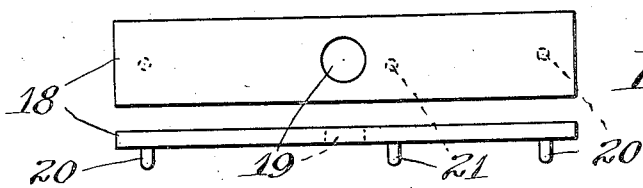
Figure 2 shows plan and side views of the centering plate.
Figure 6:
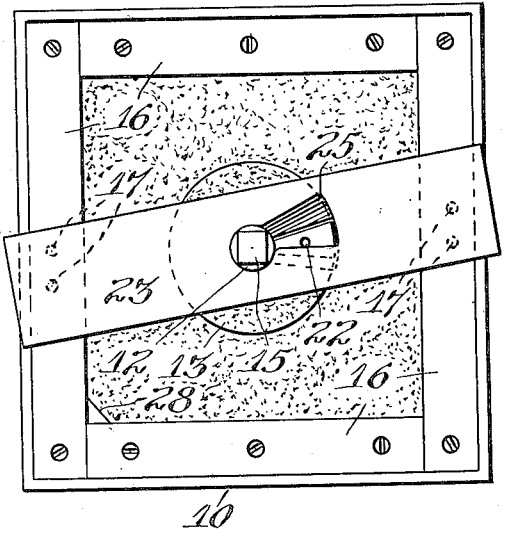
Figure 6 is a similar plan view with the guide plate in place when ready to remove the pattern.

To begin with the centering plate 18 is removed and a guide plate is brought into play. Such guide plate appears at 23 in Figure 3, the same comprising a plate having at each end a dowel pin 24 adapted to fit the other set of holes 17 in the top plates of the walls of the box. The plate is mounted obliquely as shown in Figure 6, the same having a key-hole shaped guide slot 25 which fits over the projected top end of the pattern shaft, said guide slot being of a length equal to the length of the pitch line of a flight in the pattern. Said slot 25 further is sloped downwardly through the thickness of the plate 23 to conform to the spiral curvature of the screw flights. Then a wrench, shown at 26, having a central squared opening 27, is placed over the squared top end 15 of the pattern in a manner readily to be understood. Now, then, by turning said wrench 26, the pattern 12 unwinds like a screw, with the flights thereof passing upwardly out of the box 10 and through the guide plate slot 25. During this action the pattern tail 14 comes into play and guides the vertical movement of the pattern to prevent any wobbling thereof which might injure the sand mold. It is of interest to note that the flighted section of the pattern must be completely passed out of the sand mold and box before the tail 14 leaves its aperture 11, because, as has been described, this tail may be of greater length than the pattern flight length. In this manner the tail 14 can be made, if desired, to cooperate with the guide plate 23 to prevent damage to the mold.

Figure 5:
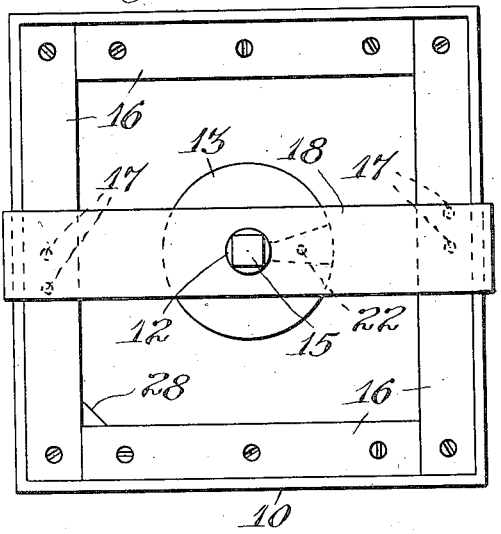
Figure 5 is a plan view of the molding box with the pattern properly located therein by the centering plate.

As shown in Figures 5 and 6, a vertical marker strip 28 is permanently located in a corner of the box 10 to form a chamfered indicating edge 28' on each sand mold as formed. The purpose of such marking will soon appear.

Figure 7:
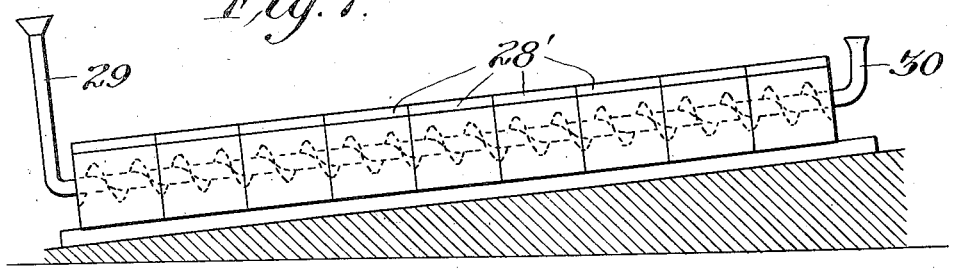
Figure 7 shows the method of lining up, end to end, completed mold sections for pouring the metal thereinto to form the improved feed screw or conveyor; and, Figure 8 is a detail elevational view showing the finished article produced in accordance with this invention.
Figure 8:
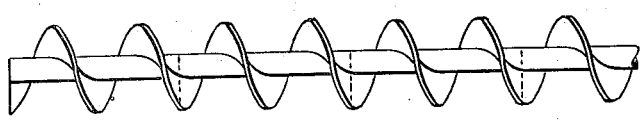

With a given length of feed screw or conveyer to be formed, the desired number of sand mold sections will be formed in the manner described. Such finished sand molds may be green or baked as desired. They are then tipped on their sides with their chamfered indicating edges 28' registering end to end. These molds are arranged on a suitable inclined support as appears in Figure 7, with adjoining sand mold sections closely packed together to form a row presenting an uninterrupted, continuous molded screw impression. An appropriate pouring spout 29 is fitted into the lower mold section and a vent 30 is fitted into the end of the mold at the far end, as shown. Under a head, the molten steel, or other metal, is poured into the spout 29, said metal under its head, working up through each successive mold section and filling the impression therein. When the metal has cooled and hardened the sand molds will be broken away and the result after removing the sprue and adhering sand will be a finished feed screw or conveyer as shown in Figure 8 formed in a solid continuous piece with adjoining sections cast homogeneously together along pitch lines, as indicated by the dotted lines in Figure 8.

To aid in removing the molds from the box it is desirable to form two sides of the box with a taper for draft purposes as will be obvious. The other two sides of the box which will be the sides adjacent the marker 28 should be disposed at an exact right angle with respect to each other so that such sides will serve as an aid when lining up the mold sections in the manner shown in Figure 7.

It must be quite apparent that this invention can be utilized in forming right or left hand screws, and, screws having in a unitary full length, variable pitches and variable diameters.

From this detailed description, it will now be clear that an improved apparatus and method are provided for manufacturing straight, smooth, one piece, feed screws and conveyers which may be of any desired size. Obviously this invention can be practiced in the formation of other twisted articles than those heretofore specifically mentioned for purposes of illustration.

It is the intention to cover herein all such changes and modifications which do not depart from the spirit and scope of my invention as defined in the following claims.

What I claim is:

1. The combination with a molding box, of a screw pattern adapted to be arranged in said box, said pattern comprising a screw section to be located inside the box, the screw section of the pattern at its ends terminating along flight pitch lines so that the ends thereof lie substantially flush with the ends of the box, a guide plate at one end of the box and having a guide slot, and means positively to unscrew the pattern endwise out of the mold and box by passing the same through said guide slot.

2. The combination with a box for forming mold sections for a feed screw, of a screw pattern section arranged in the box and having flights fully to occupy the box from end to end thereof and said pattern section at its ends being cut on pitch lines, and means for removing the pattern section endwise of its length from a mold formed in the box whereby a number of such formed molds may be arranged end to end in registry for pouring a continuous feed screw with the adjacent sections thereof fusing along pitch lines to form a one piece integral feed screw.

3. The combination with a box for forming mold sections for a feed screw, of a screw pattern having one or more flights arranged therein, said pattern at its ends being abruptly cut along pitch lines, and means for guiding and enabling removal of the pattern endwise of its length from a mold formed in the box, whereby a number of such formed molds may be arranged end to end in registry to pour a continuous feed screw with the adjacent sections thereof fused along pitch lines to form a one piece integral feed screw.

4. The combination with a molding box, of a screw pattern adapted to be arranged in said box, said pattern comprising a screw section to be located inside the box, the screw section of the pattern at its ends terminating abruptly along flight pitch lines to form a sectional mold of the same configuration, said pattern being removable endwise of the mold and box.

5. The combination with a molding box, of a screw pattern adapted to be arranged in said box, said pattern comprising a screw section to be located inside the box, the screw section of the pattern at its ends terminating abruptly along flight pitch lines to form a sectional mold of the same configuration, means for turnably withdrawing the pattern endwise of its length from the box, and means for guiding its movement during such withdrawal.

6. The combination with a molding box, of a screw pattern adapted to be arranged in said box, said pattern comprising a screw section to be located inside the box, the screw section of the pattern at its ends terminating abruptly along flight pitch lines to form a sectional mold of the same configuration, means for centering and properly holding the pattern in the box during formation of the mold, and a slotted guide carried by the box, said pattern being removable endwise of its length through said slotted guide.

HERMAN J. GEORGEN.